Figure 1:
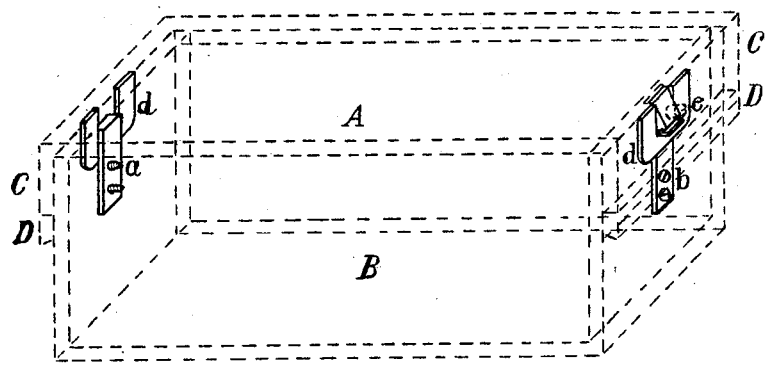

E. E. PAGE.
Fastenings for Box Covers.

No. 150,185.          Patented April 28, 1874.

WITNESSES.
Edw. Dummer
Walter Hoxie

INVENTOR.
E. Emerson Page

UNITED STATES PATENT OFFICE.

E. EMERSON PAGE, OF BOSTON, MASSACHUSETTS.

IMPROVEMENT IN FASTENINGS FOR BOX-COVERS.

Specification forming part of Letters Patent No. 150,185, dated April 28, 1874; application filed August 27, 1873.

*To all whom it may concern:*

Be it known that I, E. EMERSON PAGE, of Boston, State of Massachusetts, have invented an Improvement in Box-Cover Fastenings, of which the following is a specification:

The object of my invention is to provide easily - constructed, convenient, and secure fastenings for box-covers.

Figure 1 illustrates my invention. The dotted lines represent the outlines of a box with its cover, the fastenings being shown in position by full lines.

The cover A of the box B has cleats C C fastened on two edges. These cleats shut part way down the ends of the box onto cleats D D, fastened on the ends of the box, the latter cleats serving as handles for the box. On one end of the box is fastened the fixed hook or catch $a$. Opposite this, on the other end of the box, the spring-catch $b$ is secured. The catches $a$ and $b$ hook into recesses in the inside of the corresponding cleats C C. Said recesses, as also these cleats where they come in contact with the catches, are protected by the metal plates $d\ d$, said plates being suitably cut, notched, and bent, as shown.

On putting on the cover A one of the cleats C passes down over the end of the box B, receiving the hook of the fixed catch $a$. The other end of the cover is then pressed down, the catch $b$ springing into the recess in the other cleat C. The cover is thus securely fastened down, and prevented from sliding on the box by the catches resting in the notches of the plates $d\ d$. To open the box a suitable rod is thrust in the hole $e$, through the cleat C, opposite the spring-catch, and pressed against the catch, the cover then being easily raised.

The advantages of my invention are, the ease of construction and operation, especially desirable in a class of packing-boxes constructed similar to the one shown, and on which the covers are now fastened by screws, the concealment of the fastenings, so that the boxes are not likely to be tampered with or be accidentally opened, as they are with ordinary outside fastenings.

I claim as my invention—

The combination of the fixed catch $a$, the spring-catch $b$, operated by pressure inward, and the plates $d\ d$, placed in recesses in the cleats, all forming a concealed fastening, as described.

E. EMERSON PAGE.

Witnesses:
    EDW. DUMMER,
    WALTER HOXIE.